(12) United States Patent
Behboodi et al.

(10) Patent No.: US 11,929,853 B2
(45) Date of Patent: Mar. 12, 2024

(54) DATA-DRIVEN PROBABILISTIC MODELING OF WIRELESS CHANNELS USING CONDITIONAL VARIATIONAL AUTO-ENCODERS

(71) Applicant: QUALCOMM Incorporated, San Diego, CA (US)

(72) Inventors: Arash Behboodi, Amsterdam (NL); Simeng Zheng, San Diego, CA (US); Joseph Binamira Soriaga, San Diego, CA (US); Max Welling, Bussum (NL); Tribhuvanesh Orekondy, Diemen (NL)

(73) Assignee: QUALCOMM Incorporated, San Diego, CA (US)

( * ) Notice: Subject to any disclaimer, the term of this patent is extended or adjusted under 35 U.S.C. 154(b) by 249 days.

(21) Appl. No.: 17/504,341

(22) Filed: Oct. 18, 2021

(65) Prior Publication Data
US 2022/0123966 A1    Apr. 21, 2022

Related U.S. Application Data

(60) Provisional application No. 63/093,728, filed on Oct. 19, 2020.

(51) Int. Cl.
| | | |
|---|---|---|
| *H04L 23/02* | (2006.01) | |
| *H04B 17/391* | (2015.01) | |
| *H04L 25/02* | (2006.01) | |
| *H04L 25/03* | (2006.01) | |

(52) U.S. Cl.
CPC ..... *H04L 25/0254* (2013.01); *H04B 17/3912* (2015.01); *H04B 17/3913* (2015.01); *H04L 25/03165* (2013.01)

(58) Field of Classification Search
CPC .......... G06N 20/00; G06N 3/08; G06N 3/047; G06N 3/09; H04B 17/3912; H04B 17/3913; H04L 25/0254; H04L 25/03165; G05B 13/027
USPC ........................................ 375/262, 260, 267
See application file for complete search history.

(56) References Cited

U.S. PATENT DOCUMENTS

| | | | |
|---|---|---|---|
| 2021/0019619 A1* | 1/2021 | Bhattacharyya ....... | G06N 3/047 |
| 2021/0193259 A1* | 6/2021 | Bikard ................... | G16B 20/20 |
| 2022/0405624 A1* | 12/2022 | Takahashi ............. | G06N 20/00 |
| 2023/0229893 A1* | 7/2023 | Kamata ................. | G06N 20/00 706/20 |

OTHER PUBLICATIONS

Chettri B., et al., "Deep Generative Variational Autoencoding for Replay Spoof Detection in Automatic Speaker Verification", arxiv.org, Cornell University Library, 201 Olin Library Cornell University Ithaca, NY 14853, Mar. 21, 2020 (Mar. 21, 2020), XP081626676, pp. 1-34, section 3.5.

(Continued)

*Primary Examiner* — Khai Tran
(74) *Attorney, Agent, or Firm* — Seyfarth Shaw LLP

(57) ABSTRACT

A method performed by an artificial neural network includes determining a conditional probability distribution representing a channel based on a data set of transmit and receive sequences. The method also includes determining a latent representation of the channel based on the conditional probability distribution. The method further includes performing a channel-based function based on the latent representation.

40 Claims, 9 Drawing Sheets

(56) References Cited

OTHER PUBLICATIONS

International Search Report and Written Opinion—PCT/US2021/055614—ISA/EPO—dated Feb. 25, 2022.

Yang Z-L., et al., "VAE-Stega: Linguistic Steganography Based on Variational Auto-Encoder", IEEE Transactions on Information Forensics and Security, IEEE, USA, vol. 16, Sep. 9, 2020 (Sep. 9, 2020), pp. 880-895, XP011812558, ISSN: 1556-6013, DOI: 10.1109/TIFS.2020.3023279 [retrieved on Oct. 7, 2020] section IV and subsections figure 5.

Dorner S., et al., "WGAN-Based Autoencoder Training Over-the-Air", arXiv: 2003.02744v1 [cs.IT] Mar. 5, 2020, 5 Pages.

Kingma D.P., et al., "Auto-Encoding Variational Bayes", ICLR 2014 Conference, Dec. 2013, pp. 1-14, arXiv preprint arXiv:1312.6114v10 [stat.ML] May 1, 2014.

O'Shea T.J., et al., "Approximating the Void: Learning Stochastic Channel Models from Observation with Variational Generative Adversarial Networks", arXiv: 1805.06350v2 [cs.LG] Aug. 20, 2018, 6 Pages.

Sohn K., et al., "Learning Structured Output Representation using Deep Conditional Generative Models", Published on Dec. 7, 2015, pp. 1-9.

\* cited by examiner

DATA-DRIVEN PROBABILISTIC MODELING OF WIRELESS CHANNELS USING CONDITIONAL VARIATIONAL AUTO-ENCODERS

CROSS-REFERENCE TO RELATED APPLICATION

The present application claims the benefit of U.S. Provisional Patent Application No. 63/093,728, filed on Oct. 19, 2020, and titled "DATA-DRIVEN PROBABILISTIC MODELING OF WIRELESS CHANNELS USING CONDITIONAL VARIATIONAL AUTO-ENCODERS," the disclosure of which is expressly incorporated by reference in its entirety.

FIELD OF THE DISCLOSURE

Aspects of the present disclosure generally relate to wireless communications, and more particularly to techniques and apparatuses for data-driven probabilistic modeling of wireless channels.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. It would be desirable to apply neural network processing to wireless communications to achieve greater efficiencies.

SUMMARY

In one aspect of the present disclosure, a method using an artificial neural network is disclosed. The method includes determining a conditional probability distribution representing a channel based on a data set of transmit and receive sequences. The method also includes determining a latent representation of the channel based on the conditional probability distribution. The method further includes performing a channel-based function based on the latent representation.

Another aspect of the present disclosure is directed to an apparatus including means for determining a conditional probability distribution representing a channel based on a data set of transmit and receive sequences. The apparatus also includes means for determining a conditional probability distribution representing a channel based on a data set of transmit and receive sequences. The apparatus further includes means for performing a channel-based function based on the latent representation.

In another aspect of the present disclosure, a non-transitory computer-readable medium with non-transitory program code recorded thereon is disclosed. The program code is executed by a processor and includes program code to determine a conditional probability distribution representing a channel based on a data set of transmit and receive sequences. The program code also includes program code to determine a latent representation of the channel based on the conditional probability distribution. The program code further includes program code to perform a channel-based function based on the latent representation.

Another aspect of the present disclosure is directed to an apparatus for an artificial neural network. The apparatus having a memory, one or more processors coupled to the memory, and instructions stored in the memory. The instructions being operable, when executed by the processor, to cause the apparatus to determine a conditional probability distribution representing a channel based on a data set of transmit and receive sequences. The instructions also cause the apparatus to determine a latent representation of the channel based on the conditional probability distribution. The instructions additionally cause the apparatus to perform a channel-based function based on the latent representation.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
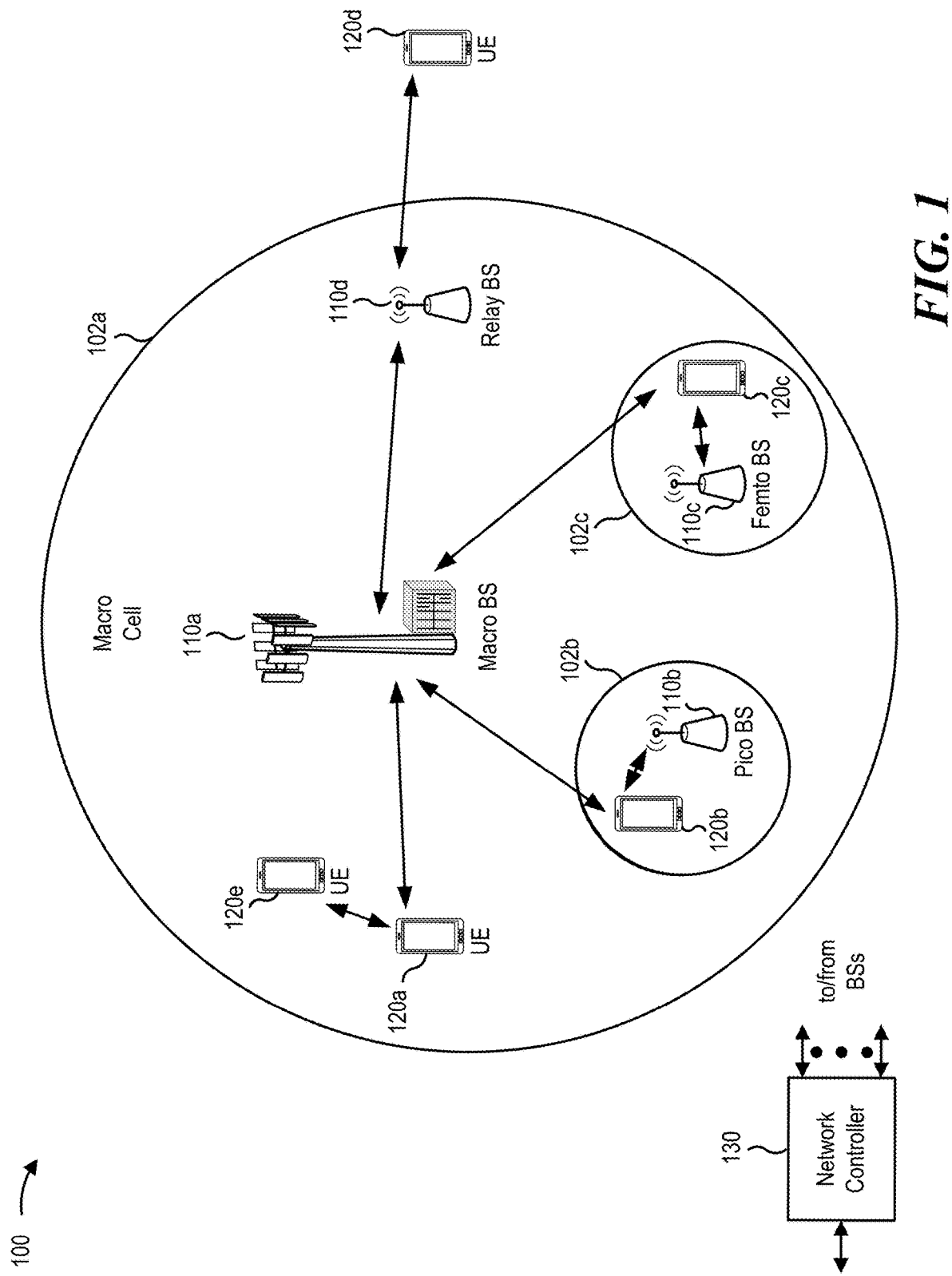
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description, illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Conventional wireless communication systems may model a wireless channel as a linear system. In such systems, propagation channel properties may be captured through a cluster of channel taps associated with gains and delays. In some examples, a conventional system models a channel based on a mathematical abstraction and physical characteristic (e.g., laws of physics) of radio frequency (RF) propagation. In such examples, parameters such as delay spread, Doppler, carrier frequency, and bandwidth may be provided to the model. The channel may then be modeled based on the parameters. In this example, it may be difficult to infer channel properties from the modeled channel. Furthermore, the models specified for a channel may be limited to generic scenarios and/or costly to build.

In other examples, a conventional system may model a channel by fitting a parametric model (e.g., model fitting) to channel measurements, such as input-output sequences. Model fitting may fail to model complex channels. Additionally, the model fitting is not tractable. That is, the model fitting is not differentiable. In contrast, a tractable model may be represented by a neural network. Additionally, the tractable model is differentiable. Therefore, one or more parameters may be learned via backpropagation.

Machine learning systems may implement generative modeling to learn a latent representation z of data x in a dataset $\{x_i, i=1, \ldots, m\}$. The latent representation may be learned based on a generative process $P_\theta(x|z)$. The generative process refers to a conditional distribution of the data x given the latent representation z. The generative model may improve inference and may learn directed probabilistic models. A variational auto-encoder (VAE) and a generative adversarial network (GAN) are examples of generative models. In some examples, a conditional VAE performs a channel-based function for estimating a channel, decoding channel codes, compressing a channel state, and/or detecting signals received via the channel. Compression refers to compressing channel states. For example, channels may be compressed for channel state feedback (CSF). Decoding refers to decoding channel codes, such as low-density parity-check (LDPC) decoding. As an example, a log-likelihood ratio (LLR) for transmitted bits may be determined based on a conditional probability of a channel. The LLR may be used for decoding, such as LDPC decoding. Finally, detection refers to finding the transmitted symbols, such as multiple-input multiple-output (MIMO) detection.

As described, a generative model, such as a VAE, may be used to estimate a channel. In such examples, the channel may be represented by a conditional probability distribution $P_\theta(y|x)$, where the parameter y represents the channel output and the parameter x represents the channel input. It may be desirable to approximate a conditional probability $P_\theta(y|x)$ of a channel (e.g., complex channel) based on tractable and differentiable architectures (e.g., neural network architectures). Additionally, it may be desirable to improve a process for generating new channel instances.

Aspects of the present disclosure generally relate to techniques and apparatuses for using a generative model in a wireless communication system. Particular aspects of the subject matter described in this disclosure may be implemented to realize one or more of the following potential advantages. In some aspects, generative modeling may improve the generation of new channels, such as new channels for simulations. As another example, generative modeling may learn the conditional distribution corresponding to the channel. Additionally, generative models may be used for training end-to-end deep learning-based transceivers. In these examples, the gradient may be back-propagated through the channel to train the generative models. Furthermore, generative models may be used as a differentiable emulator of the channel through which the gradient can be back-propagated.

FIG. 1 is a diagram illustrating a network 100 in which aspects of the present disclosure may be practiced. The network 100 may be a 5G or NR network or some other wireless network, such as an LTE network. The wireless network 100 may include a number of base stations (BSs) 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
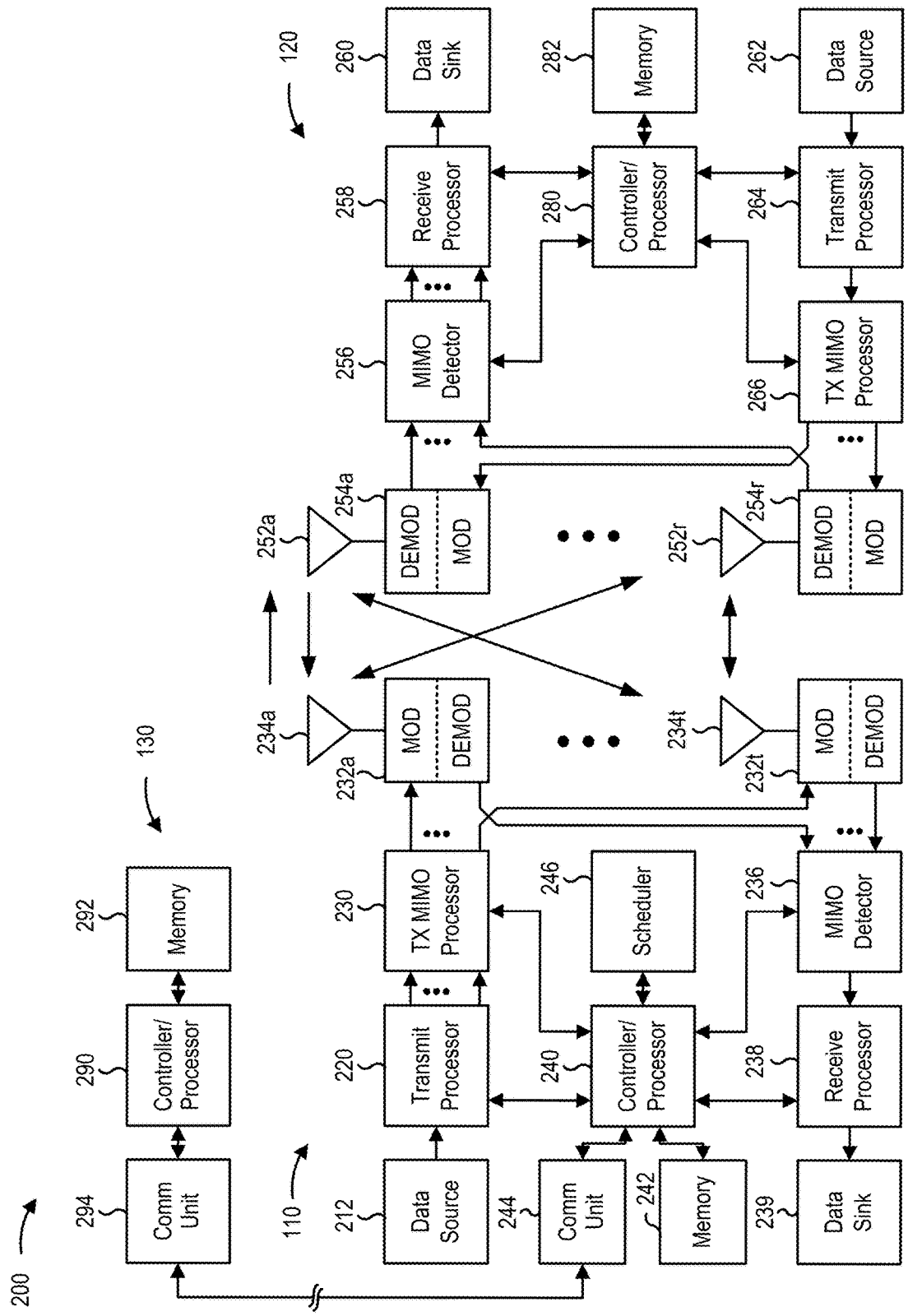
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with machine learning for channel modeling as described in more detail elsewhere. For example, the controller/processor 240 of the base station 110, the controller/processor 280 of the UE 120, and/or any other component(s) of FIG. 2 may perform or direct operations of, for example, the processes of FIG. 6. Memories 242 and 282 may store data and program codes for the base station 110 and UE 120, respectively. A scheduler 246 may schedule UEs for data transmission on the downlink and/or uplink.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Figure 3:
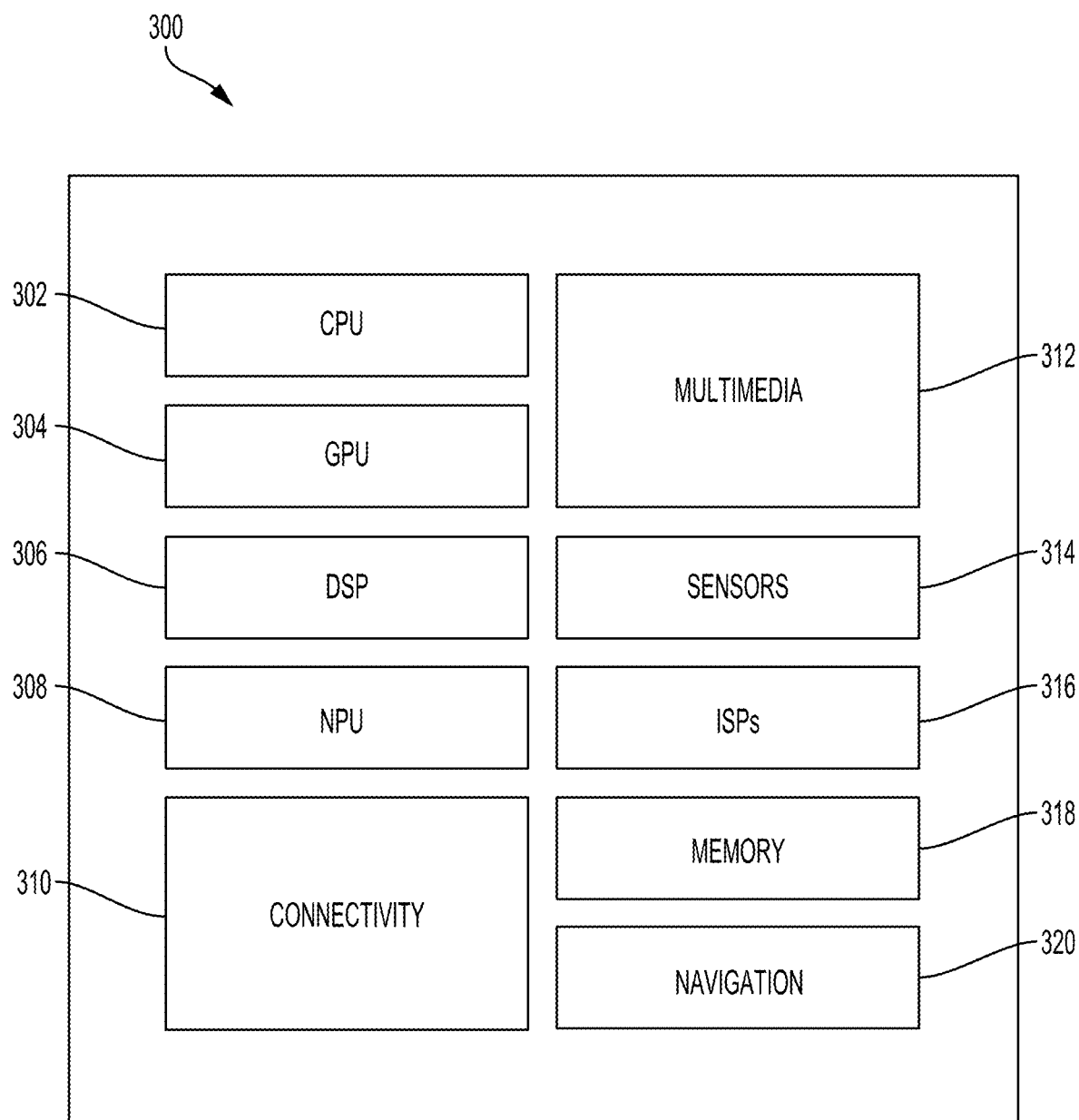
FIG. 3 illustrates an example implementation of designing a neural network using a system-on-a-chip (SOC), including a general-purpose processor, in accordance with certain aspects of the present disclosure.

FIG. 3 illustrates an example implementation of a system-on-a-chip (SOC) 300, which may include a central processing unit (CPU) 302 or a multi-core CPU configured for generating gradients for neural network training, in accordance with certain aspects of the present disclosure. The SOC 300 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 308, in a memory block associated with a CPU 302, in a memory block associated with a graphics processing unit (GPU) 304, in a memory block associated with a digital signal processor (DSP) 306, in a memory block 318, or may be distributed across multiple blocks. Instructions executed at the CPU 302 may be loaded from a program memory associated with the CPU 302 or may be loaded from a memory block 318.

The SOC 300 may also include additional processing blocks tailored to specific functions, such as a GPU 304, a DSP 306, a connectivity block 310, which may include fifth generation (5G) connectivity, fourth generation long term evolution (4G LTE) connectivity, Wi-Fi connectivity, USB connectivity, Bluetooth connectivity, and the like, and a multimedia processor 312 that may, for example, detect and recognize gestures. In one implementation, the NPU is implemented in the CPU, DSP, and/or GPU. The SOC 300 may also include a sensor processor 314, image signal processors (ISPs) 316, and/or navigation module 320, which may include a global positioning system.

The SOC 300 may be based on an ARM instruction set. In an aspect of the present disclosure, the instructions loaded into the general-purpose processor 302 may comprise code to determine a conditional probability distribution representing a channel based on a data set of transmit and receive sequences; determine a latent representation of the channel based on the conditional probability distribution; and perform a channel-based function based on the latent representation.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
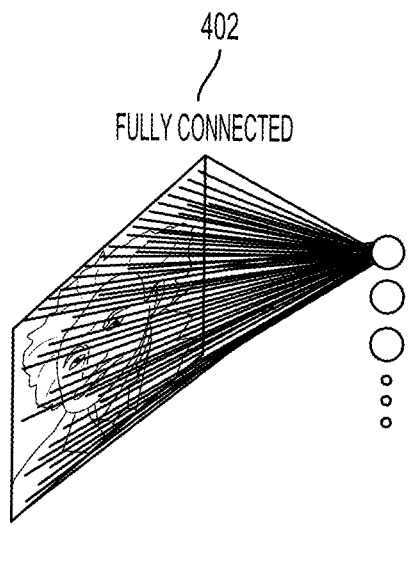
FIGS. 4A, 4B, and 4C are diagrams illustrating a neural network, in accordance with aspects of the present disclosure.
Figure 4B:
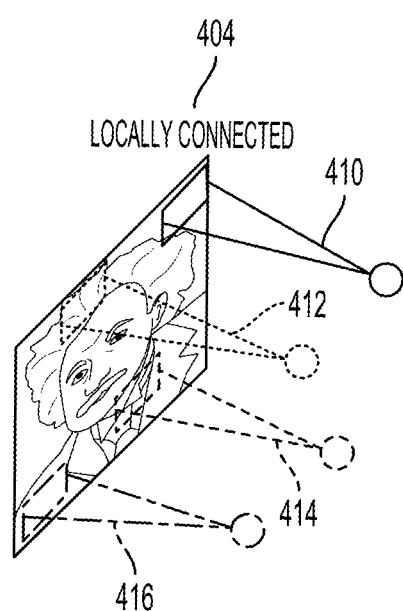

The connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
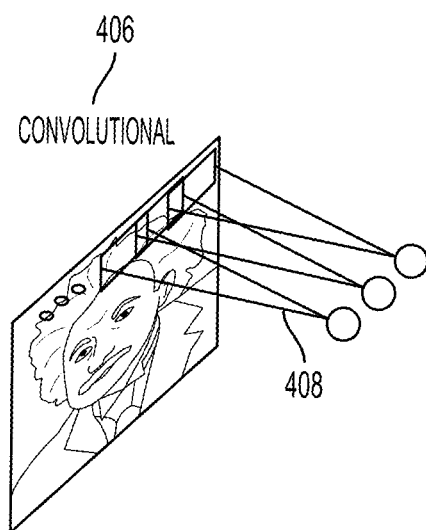

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 4D:
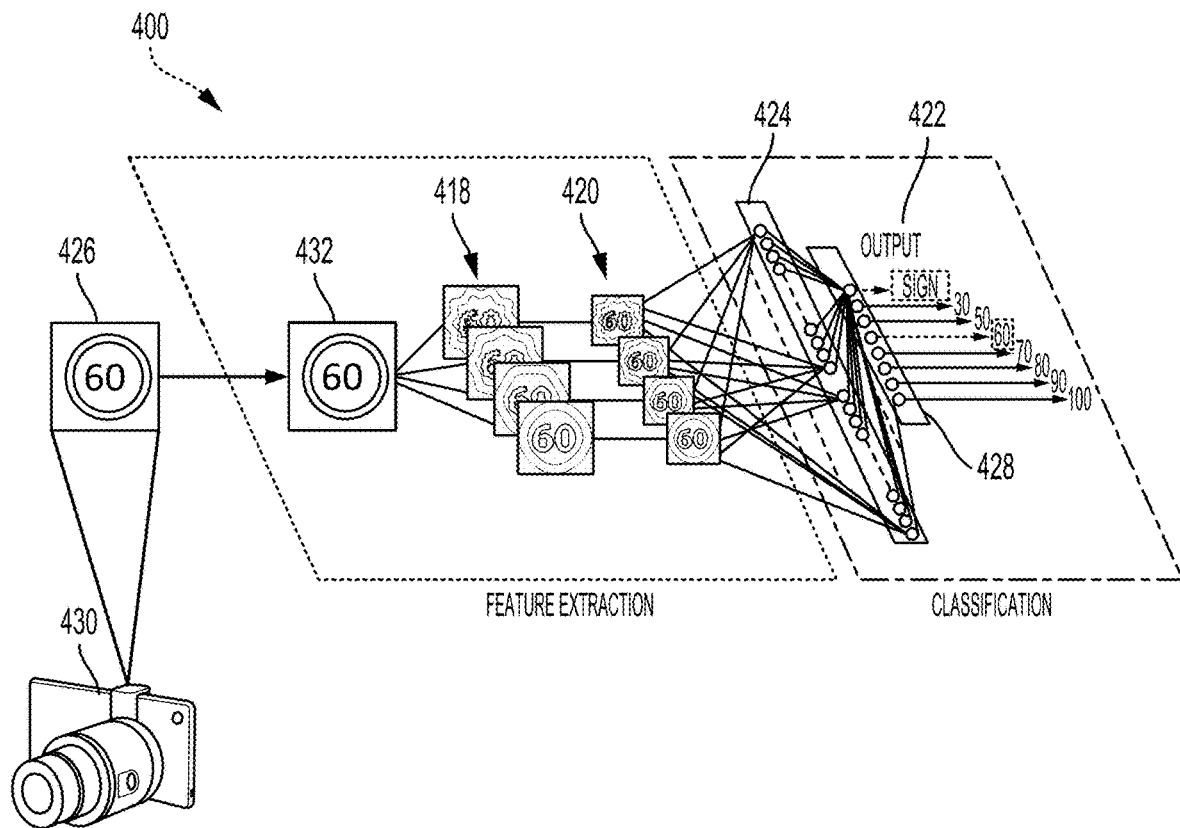
FIG. 4D is a diagram illustrating an exemplary deep convolutional network (DCN), in accordance with aspects of the present disclosure.

One type of convolutional neural network is a deep convolutional network (DCN). FIG. 4D illustrates a detailed example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426 (e.g., "sign" and "60"). The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 426) and a forward pass through the network may yield an output 422 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5:
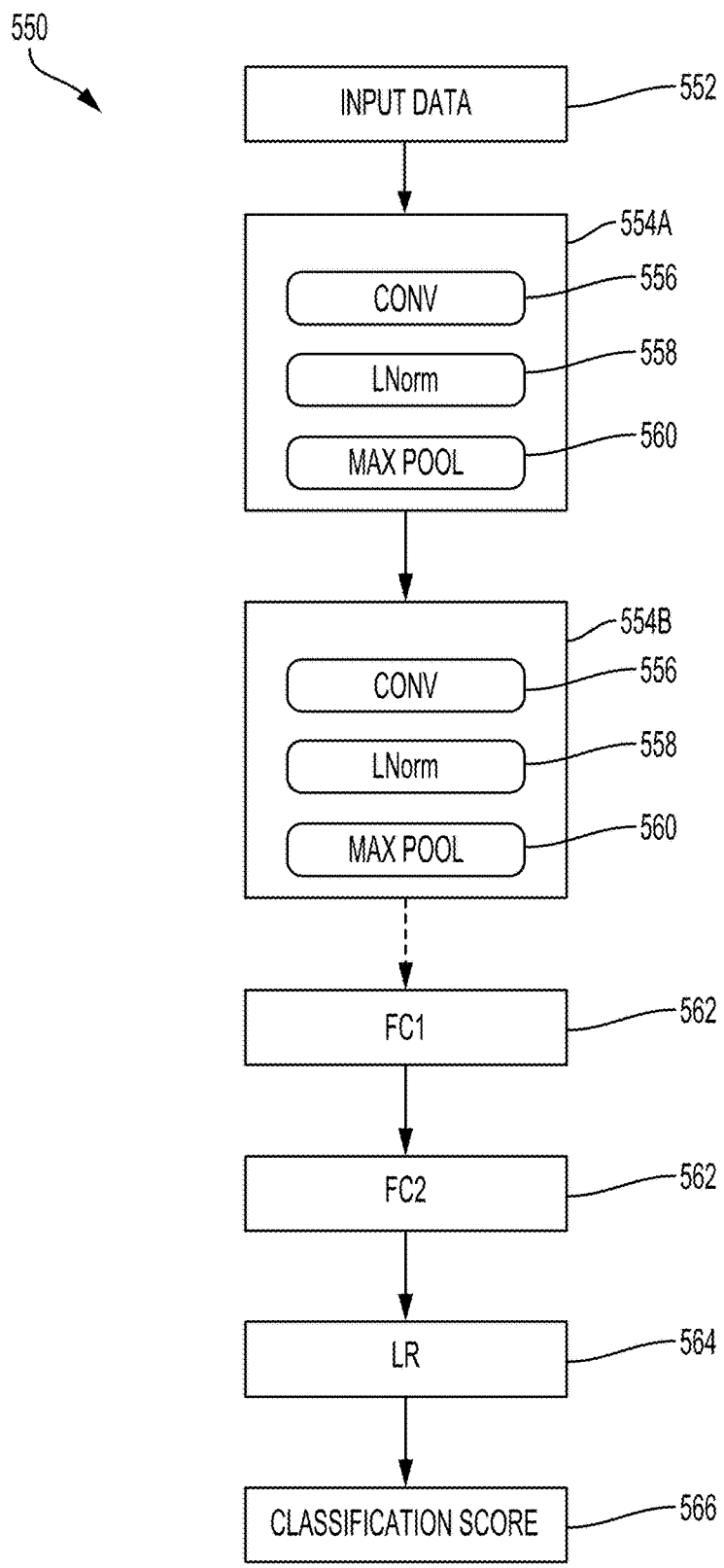
FIG. 5 is a block diagram illustrating an exemplary deep convolutional network (DCN), in accordance with aspects of the present disclosure.

FIG. 5 is a block diagram illustrating a deep convolutional network 550. The deep convolutional network 550 may include multiple different types of layers based on connectivity and weight sharing. As shown in FIG. 5, the deep convolutional network 550 includes the convolution blocks 554A, 554B. Each of the convolution blocks 554A, 554B may be configured with a convolution layer (CONV) 356, a normalization layer (LNorm) 558, and a max pooling layer (MAX POOL) 560.

The convolution layers 556 may include one or more convolutional filters, which may be applied to the input data to generate a feature map. Although only two of the convolution blocks 554A, 554B are shown, the present disclosure is not so limiting, and instead, any number of the convolution blocks 554A, 554B may be included in the deep convolutional network 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 302 or GPU 304 of an SOC 300 to achieve high performance and low power consumption. In alternative embodiments, the parallel filter banks may be loaded on the DSP 306 or an ISP 316 of an SOC 300. In addition, the deep convolutional network 550 may access other processing blocks that may be present on the SOC 300, such as sensor processor 314 and navigation module 320, dedicated, respectively, to sensors and navigation.

The deep convolutional network 550 may also include one or more fully connected layers 562 (FC1 and FC2). The deep convolutional network 550 may further include a logistic regression (LR) layer 564. Between each layer 556, 558, 560, 562, 564 of the deep convolutional network 550 are weights (not shown) that are to be updated. The output of each of the layers (e.g., 556, 558, 560, 562, 564) may serve as an input of a succeeding one of the layers (e.g., 556, 558, 560, 562, 564) in the deep convolutional network 550 to learn hierarchical feature representations from input data 552 (e.g., images, audio, video, sensor data and/or other input data) supplied at the first of the convolution blocks 554A. The output of the deep convolutional network 550 is a classification score 566 for the input data 552. The classification score 566 may be a set of probabilities, where each probability is the probability of the input data, including a feature from a set of features.

As indicated above, FIGS. 3-5 are provided as examples. Other examples may differ from what is described with respect to FIGS. 3-5.

As discussed above, machine learning systems may implement generative modeling to learn a latent representation z of the data x in a dataset $\{x_i, i=1, \ldots, m\}$. The latent representation may be learned based on a generative process $P_\theta(x|z)$. The generative process refers to a conditional distribution of the data x given the latent representation z. In some examples, generative models may estimate a density function and generate new samples by randomly choosing a latent representation z. A variational auto-encoder (VAE) and a generative adversarial network (GAN) are examples of generative models. It may be desirable to use generative modeling for wireless channels. For example, generative modeling may improve the generation of new channels, such as new channels for simulations. As another example, generative modeling may learn the conditional distribution corresponding to the channel. Additionally, generative models may be used for training end-to-end deep learning-based transceivers. To train these models, a gradient may be back-propagated through the channel. Furthermore, generative models may be used as a differentiable emulator of the channel through which the gradient can be back-propagated.

Aspects of the present disclosure are directed to using generative models to model communication channels, such as wireless communication channels. The channel may be represented using its conditional distribution to include non-linear effects. The non-linear effects (e.g., channel non-linearity) may be caused by, for example, devices, amplifiers, and/or quantizers. In one configuration, conditional variational auto-encoders may be used to learn the conditional distribution. In some aspects, a channel decoder may include a differentiable channel model, which may model the communication channel as a conditional probability distribution. Additionally, new channels may be generated based on a latent variable. The new channels may be used to build neural channel models from field data.

In a communication system, such as a wireless communication system, a channel may receive an input x and provide an output y. The input x and the output y may be referred to as a transmit-receive sequence or an input-output sequence. As described, aspects of the present disclosure are directed to learning a probability distribution (e.g., probabilistic representation) of a channel. In this example, the probability distribution is the probability of obtaining an output y given an input x. After learning the probability distribution, the channel may be simulated or approximated by a machine learning model.

In some examples, the conditional probability distribution of the channel may be represented as $P_\theta(y|x)$, where the parameter y represents the channel output, and the parameter x represents the channel input. It may be desirable to approximate a conditional probability $P_\theta(y|x)$ of a channel (e.g., complex channel) based on tractable and differentiable architectures (e.g., neural network architectures). Additionally, it may be desirable to improve a process for generating new channel instances.

As discussed, a conditional VAE may perform a channel-based function for estimating a channel, decoding channel codes, compressing a channel state, and/or detecting signals received via the channel. Compression refers to compressing channel states. For example, channels may be compressed for channel state feedback (CSF). Decoding refers to decoding channel codes, such as low-density parity-check (LDPC) decoding. As an example, a log-likelihood ratio (LLR) for transmitted bits may be determined based on a conditional probability of a channel. The LLR may be used for decoding, such as LDPC decoding. Finally, detection refers to finding the transmitted symbols, such as multiple-input multiple-output (MIMO) detection.

Figure 6:
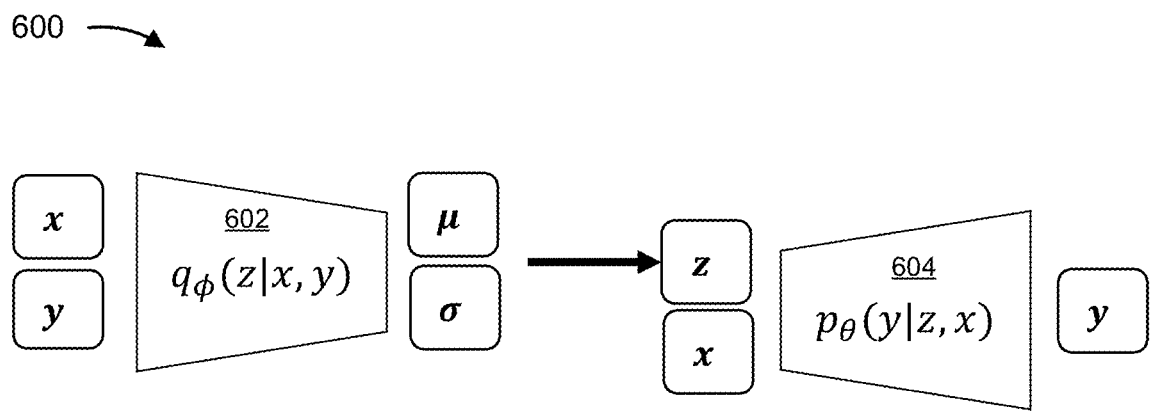
FIG. 6 is a block diagram illustrating an example of a conditional variational auto-encoder (VAE), in accordance with aspects of the present disclosure.

FIG. 6 is a block diagram illustrating an example of a conditional variational auto-encoder (CVAE) 600, in accordance with aspects of the present disclosure. The CVAE 600 may also be referred to as the conditional VAE 600. As shown in FIG. 6, the conditional VAE 600 may be incorporated in one or both of a transmitting device or a receiving device. In the example of FIG. 6, the conditional VAE 600 may learn a latent representation z conditioned on a channel input x. As shown in the example of FIG. 6, the conditional VAE 600 includes an encoder 602 and a decoder 604. The encoder 602 may be an artificial neural network that implements an encoding function $q_\phi(z|x,y)$. In one configuration, the encoder 602 receives an input x and an output y. In the current disclosure, the input x may be referred to as a channel input x and the output y may be referred to as a channel output y. In some examples, the channel input x may be a sample of the channel input x, such as a sample of a received orthogonal frequency division (OFDM) waveform. Additionally, the channel output y may be a sample of the channel output y, such as a sample of a transmitted OFDM waveform. As shown in the example of FIG. 6, the encoder 602 determines a mean $\mu(x, y)$ (shown as "$\mu$") of the channel input x and the channel output y, and a variance $\sigma(x, y)$ (shown as "$\sigma$") the channel input x and the channel output y associated with a Gaussian distribution of the latent representation z. The mean $\mu(x, y)$ and variance $\sigma(x, y)$ may be based on the channel input x and the channel output y. Thus, the encoder 602 may generate a latent representation z based on the channel input x and the channel output y.

Additionally, the decoder 604 may be an artificial neural network that implements a decoding function $p_\theta(y|z,x)$. The decoder 604 assumes a Gaussian posterior, such that a conditional distribution of the channel output y given the channel input x and the channel state information is Gaussian determined by the additive noise of the receiver. As shown in FIG. 6, the decoder 604 may determine the output channel y based on the latent representation z and the input channel x. The latent representation z may be sampled (e.g., randomly sampled) from the mean $\mu(x, y)$ and variance $\sigma(x, y)$ of the Gaussian distribution. Each one of encoding function $q_\phi(z|x, y)$ and the decoding function $p_\theta(y|z, y)$ represent probability distributions.

In some examples, during training, a loss function determines a loss based on the mean $\mu$, the variance $\sigma$, and L random samples of the latent representation z. That is, the latent representation z may be randomly based on the Gaussian distribution, $z^{(l)}=\sigma\odot\epsilon+\mu$, where the parameter $\epsilon$ represents a random variable and the parameter l represents a current random sample of the L random samples. The loss may be defined as:

$$\text{Loss}_{CVAE} \cong \frac{1}{2}\sum_{j=1}^{J}(1+\log(\sigma_j^2)-\mu_j^2-\sigma_j^2)+\frac{1}{L}\sum_{l=1}^{L}[\log p_\theta(y|x,z^{(l)})] \quad (1)$$

According to aspects of the present disclosure, during training, the loss $\text{Loss}_{CVAE}$ may be minimized to train the conditional VAE 600. In Equation 1, $\frac{1}{2}\sum_{j=1}^{J}(1+\log(\sigma_j^2)-\mu_j^2-\sigma_j^2)$ represents a Kullback-Leibler divergence term with $\sigma_j$, $\mu_j$ obtained as an output of the encoder 602. Additionally, $$\frac{1}{L}\sum_{l=1}^{L}[\log p_\theta(y|x,z^{(l)})]$$

represents an expected value of the reconstruction loss computed using the output of the decoder 604. During training, L may be equal to one. The VAE maximizes a likelihood of data log $p_\theta(y|x)$ by maximizing n evidence lower bound. The evidence lower bound consists of two terms. The first one is the Kullback-Leibler divergence term, and the second term is the reconstruction loss. After training, the trained encoder 602 and the trained decoder 604 may be used for various modeling and inference tasks.

In some aspects, the conditional VAE 600 may be a component of a channel modeling system. In some such aspects, the channel modeling system collects channel inputs x and corresponding channel outputs y (e.g., input-output sequences) and generates a dataset of the collected samples $(x_i, y_i)$ for i=1, ..., N.

Figure 7A:
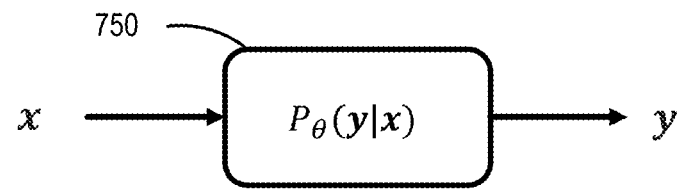
FIG. 7A is a block diagram illustrating an example of a channel, in accordance with aspects of the present disclosure.

FIG. 7A is a block diagram illustrating an example of a channel 750, in accordance with aspects of the present disclosure. As discussed, the channel 750 may be a wireless channel. Still, the channel is not limited to a wireless channel and may be another type of communication channel. As shown in the example of FIG. 7A, the channel 750 includes a channel input x and a channel output y. In the example of FIG. 7A, the channel input x may be transmitted by a transmitter, such as a UE 120 or a base station 110 as described in FIGS. 1 and 2. Additionally, the channel output y may be received at a receiver, such as a UE 120 or a base station 110 as described in FIGS. 1 and 2. Non-linear effects of the channel 750 may cause differences between the channel input x and the channel output y. The non-linear effects may be caused by, for example, network devices, amplifiers, and/or quantizers.

As described, aspects of the present disclosure are directed to learning a probability distribution $P_\theta(y|x)$ (e.g., probabilistic representation) of the channel 750. In this example, the probability distribution $P_\theta(y|x)$ is the probability of obtaining the channel output y given the channel input x. Additionally, as discussed, a conditional VAE, such as the conditional VAE 600 described in FIG. 6, may learn a latent representation z of the channel 750 conditioned on the channel input x.

Figure 7B:
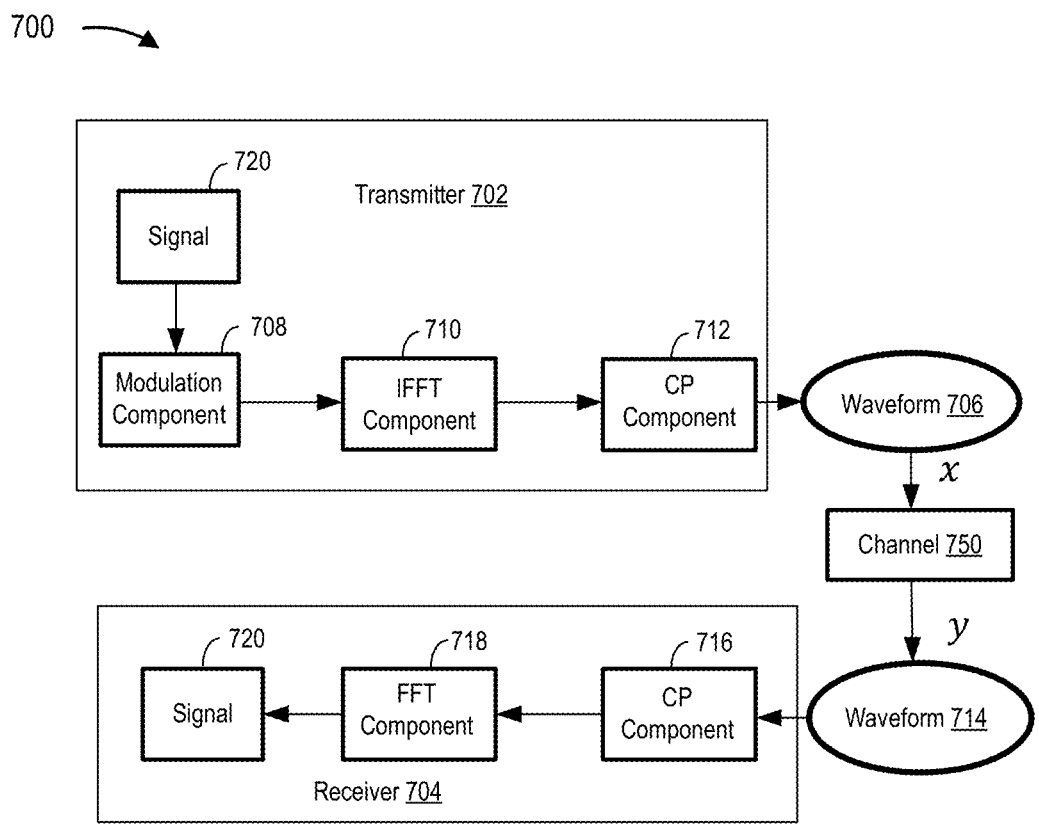
FIG. 7B is a block diagram illustrating an example of a channel modeling system, in accordance with aspects of the present disclosure.

As discussed above, the channel 750 includes a channel input x and a channel output y. In some examples, the channel input x may be a waveform generated by a transmitter and the channel output y may be a waveform received at a receiver. FIG. 7B is a block diagram illustrating an example of a channel modeling system 700, in accordance with aspects of the present disclosure. In the example of FIG. 7B, the channel modeling system 700 includes a transmitter 702 for generating a waveform 706, corresponding to a channel input x as described in FIG. 7A, and a receiver 704 for receiving a waveform 714, corresponding to a channel output y as described in FIG. 7A. The transmitter 702 and the receiver 704 may be examples of either a UE 120 or a base station 110, as described in FIGS. 1 and 2. That is, both the UE 120 and the base station 110 include components that perform the functions of the transmitter 702 and the receiver 704. In the example of FIG. 7B, the transmitter 702 may transmit a transmitter waveform 706, such as an orthogonal frequency demodulation (OFDM) waveform. The transmitter waveform 706 may be an example of the channel input x. Prior to transmitting the transmitter waveform 706, the transmitter 702 may modulate a signal 720 at a modulation component 708, perform an inverse fast Fourier transformation (IFFT) at an IFFT component 710, and add a cyclic prefix (CP) at a CP component 712. In some examples, the modulation component 708 may modulate the signal via quadrature phase shift keying (QPSK) modulation.

As shown in FIG. 7B, a channel 750 receives the channel input x (e.g., transmitter waveform 706) and produces a channel output y (e.g., receiver waveform 714). The channel 750 may be an example of the channel 750 described in FIG. 7A. The transmission may be received at the receiver 704 as a receiver waveform 714, such as an OFDM waveform. As shown in the example of FIG. 7B, the receiver 704 may remove the cyclic prefix (CP) at a CP component 716 and perform a fast Fourier transformation (FFT) at an FFT component 718 to obtain the signal 720. According to aspects of the present disclosure, a dataset for a channel modeling system 700 consists of different channel input and channel output samples $(x_i, y_i)$.

In one configuration, the channel modeling is data driven. For example, a generative model may be built based on field measurements. The field measurements may include limited resolution input and output waveforms, or high resolution channel impulse response measurements (e.g., a delay, angular, and Doppler profile). Additional information can be also used for model building, such information may include, for example, one or more of location information, delay spread, carrier frequency, or bandwidth. In such configurations, a posterior distribution of an encoding function $q_\varphi(z|x, y)$ (e.g., channel representation) and the decoding function $p_\theta(y|x; z)$ (e.g., approximate conditional distribution) may be learned from field measurements.

The conditional probability of the channel may be differentiable and may be used for designing data-driven communication systems. As the decoding function $p_\theta(y|x; z)$ may be used for decoding and/or channel detection. As another example, the encoding function $q_\varphi(z|y; x)$ or the decoding function $p_\theta(y|x; z)$ may be used for channel estimation and/or channel compression.

In some aspects, the channel may be simulated by randomly selecting the latent representation z. In such aspects, a new channel instance may be obtained for each latent representation z. As discussed, the latent representation z may represent the channel. Therefore, for a specific environment, the channel is known if the latent representation z is determined. In some examples, the latent representation z may be determined by knowing the channel input x and the channel output y.

In one configuration, channel likelihoods (e.g., conditional probability distribution) may be used to estimate a channel. That is, conditional probability distributions may be learned from channel input and output measurements. In this configuration, a conditional variational auto-encoder (VAE), such as the conditional VAE 600 of FIG. 6, may be used to learn a latent representation z of the channel. The conditional VAE 600 may be trained by backpropagation using reparametrization. In some examples, the latent representation z may be determined based on a pilot signal $x_{pilot}$ (e.g., channel input) and a channel output y. In this example, the conditional probability $P_\theta(y|x, z)$ may estimate the latent representation z: $\hat{z} = \arg\max P_\theta(y|x_{pilot}, z)$. The parameter $\hat{z}$ may be determined based on gradient descent. In this example, the parameter $\hat{z}$ is determined based on a value of the latent representation z that maximizes a probability of obtaining the output y based on the pilot signal $x_{pilot}$.

In another configuration, a channel input x may be estimated from the channel output y and the latent representation z (e.g., estimated channel). In this example, the conditional probability $P_\theta(y|x, z)$ may use the latent representation z obtained from the channel estimation to estimate the input x: $\hat{x} = \arg\max P_\theta(y|x, z)$. In this example, the parameter $\hat{x}$ may be determined based on gradient descent. Specifically, the parameter $\hat{x}$ may be determined based on a value of the latent representation z that maximizes a probability of obtaining the channel output y based on the latent representation z.

In yet another configuration, the latent representation z may be used to design an end-to-end deep learning-based communication system, where conventional channel encoders (e.g., transmitters) and decoders (e.g., receivers) may be replaced by artificial neural networks. Aspects of the present disclosure may be implemented to back-propagate through the channel as the channel model is differentiable. Therefore, the neural network-based channel encoders and decoders may be trained based on the differentiable channel.

As discussed, according to aspects of the present disclosure, the generative model may generate new channels for simulation, testing, and/or other purposes. Additionally, or alternatively, a compressed representation of the channel may be generated based on the latent representation. As an example, the compressed representation may be used for channel state feedback (CSF).

In some examples, the generative model may be used to simulate a communication system and/or design a communication system. In such examples, the generative model may be obtained from a conditional VAE, such as the conditional VAE 600 of FIG. 6. The conditional VAE may assume a Gaussian distribution over the latent variable. Additionally, the decoding function $p_\theta(y|x, z)$ of the conditional VAE may generate new channel instances by randomly choosing the latent distribution z following a standard Gaussian. The generative model may be trained for existing simulators to improve sample generation with differentiable models.

Figure 8:
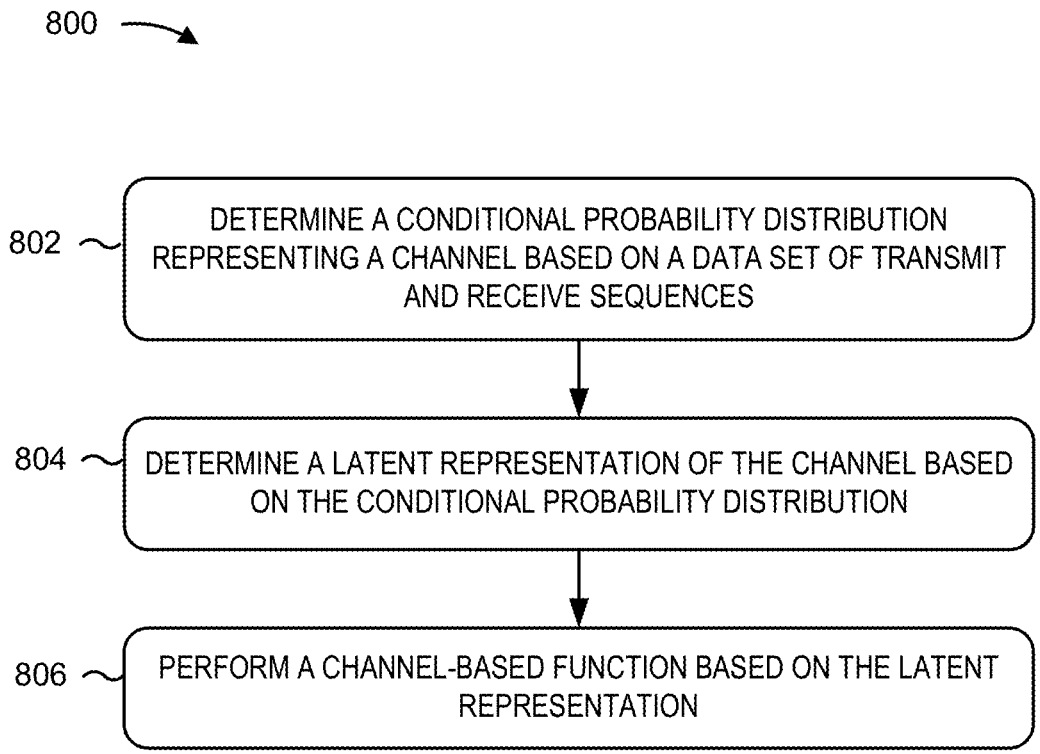
FIG. 8 is a flow diagram illustrating an example process performed, for example, by an artificial neural network, in accordance with various aspects of the present disclosure.

FIG. 8 is a flow diagram illustrating an example process 800 performed, for example, by an artificial neural network, in accordance with various aspects of the present disclosure. The example process 800 is an example of performing a channel-based function based on the latent representation determined based on a conditional probability distribution representing a channel. The process 800 may be performed by an artificial neural network (ANN) comprising a conditional VAE, such as the conditional VAE 600 of FIG. 6. As shown in FIG. 8, at block 802 the ANN determines a conditional probability distribution representing a channel based on a data set of transmit and receive sequences. The transmit and receive sequences may be collected based on first data transmitted on the channel by a transmitter and second data received on the channel at a receiver. In some examples, for each transmit and receive sequence, the first data corresponds to the second data. Additionally, in some examples, the ANN obtains an instance of a latent variable by sampling a Gaussian distribution of the latent representation, and determines the conditional probability distribution based on the instance of the latent variable.

Additionally, as shown in FIG. 8, at block 804, the ANN determines a latent representation of the channel based on the conditional probability distribution. Furthermore, at block 806, the ANN performs a channel-based function based on the latent representation. In some examples, the channel-based function may be performed via the conditional VAE. Additionally, the channel-based function may include one or more of estimating one or more properties associated with the channel, decoding channel codes, compressing a channel state, or detecting symbols.

Implementation examples are described in the following numbered clauses.

1. A method performed by an artificial neural network comprising:
   determining a conditional probability distribution representing a channel based on a data set of transmit and receive sequences; determining a latent representation of the channel based on the conditional probability distribution; and performing a channel-based function based on the latent representation.
2. The method of Clause 1, in which the artificial neural network comprises a conditional variational auto-encoder (VAE), the conditional VAE comprising an encoder and a decoder.
3. The method of Clause 2, further comprising performing the channel-based function via the conditional VAE, the channel-based function comprising estimating one or more properties associated with the channel, decoding channel codes, compressing a channel state, and detecting symbols.
4. The method of any one of Clause 2-3, in which performing the channel function comprises randomly selecting an instance of a latent variable from the latent representation to generate a simulated channel by the decoder of the conditional VAE.
5. The method of any one of Clause 2-3, in which performing the channel function comprises back propagating through the channel to train a neural network based communication system end-to-end.
6. The method of Clause 5, in which the neural network based communication system is a hybrid system comprising:
   a neural network receiver or a neural network transmitter; or
   a full neural network based system comprising the neural network receiver and the neural network transmitter.
7. The method of any one of Clause 2-6, further comprising determining the conditional probability distribution via the conditional VAE.
8. The method of any one of Clause 2-7, further comprising:
   obtaining an instance of a latent variable by sampling a Gaussian distribution of the latent representation; and
   determining the conditional probability distribution based on the instance of the latent variable.
9. The method of Clause 8, further comprising generating a new channel based on the instance of the latent variable.
10. The method of any one of Clauses 1-9, further comprising collecting the transmit and receive sequences based on first data transmitted on the channel by a transmitter and second data received on the channel at a receiver.
11. The method of Clause 10, in which, for each transmit and receive sequence, the first data corresponds to the second data.
12. An artificial neural network comprising a processor, memory coupled with the processor, and instructions stored in the memory and operable, when executed by the processor to cause the artificial neural network to perform any one of Clauses 1 through 11.
13. An apparatus for facilitating communication over a channel, comprising at least one means for performing any one of Clauses 1 through 11.
14. A computer program comprising code for causing an artificial neural network to perform any one of Clauses 1 through 11.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:
1. A computer-implemented method using an artificial neural network comprising:

determining a conditional probability distribution representing a wireless communication channel based on a data set of transmit and receive sequences associated with one or more wireless communication node;

determining a latent representation of the wireless communication channel based on the conditional probability distribution; and performing a channel-based function based on the latent representation.

2. The computer-implemented method of claim 1, in which the artificial neural network comprises a conditional variational auto-encoder (VAE), and the conditional VAE comprises an encoder and a decoder.

3. The computer-implemented method of claim 2, further comprising performing the channel-based function via the conditional VAE, the channel-based function comprising estimating one or more properties associated with the wireless communication channel, decoding channel codes, compressing a channel state, and detecting symbols.

4. The computer-implemented method of claim 2, in which performing the channel function comprises randomly selecting an instance of a latent variable from the latent representation to generate a simulated wireless communication channel by the decoder of the conditional VAE.

5. The computer-implemented method of claim 2, in which performing the channel function comprises back propagating through the wireless communication channel to train a neural network based communication system end-to-end.

6. The computer-implemented method of claim 5, in which the neural network based communication system is a hybrid system comprising:
a neural network receiver or a neural network transmitter; or
a full neural network based system comprising the neural network receiver and the neural network transmitter.

7. The computer-implemented method of claim 2, further comprising determining the conditional probability distribution via the conditional VAE.

8. The computer-implemented method of claim 2, further comprising:
obtaining an instance of a latent variable by sampling a Gaussian distribution of the latent representation; and
determining the conditional probability distribution based on the instance of the latent variable.

9. The computer-implemented method of claim 8, further comprising generating a new wireless communication channel based on the instance of the latent variable.

10. The computer-implemented method of claim 1, further comprising collecting the transmit and receive sequences based on first data transmitted on the wireless communication channel by a transmitter and second data received on the wireless communication channel at a receiver.

11. The computer-implemented method of claim 10, in which, for each transmit and receive sequence, the first data corresponds to the second data.

12. An apparatus for facilitating communication over a channel, the apparatus comprising:
means for determining a conditional probability distribution representing the wireless communication channel based on a data set of transmit and receive sequences associated with one or more wireless communication node;
means for determining a latent representation of the wireless communication channel based on the conditional probability distribution; and
means for performing a channel-based function based on the latent representation.

13. The apparatus of claim 12, in which the apparatus comprises a means for conditional variational encoding, and the means for conditional variational encoding comprises means for encoding and a means for decoding.

14. The method of claim 13, further comprising means for performing the channel-based function via the means for conditional variational encoding, the channel-based function comprising estimating one or more properties associated with the wireless communication channel, decoding channel codes, compressing a channel state, and detecting symbols.

15. The method of claim 13, in which the means for performing the channel function comprises means for randomly selecting an instance of a latent variable from the latent representation to generate a simulated wireless communication channel by the means for decoding.

16. The method of claim 13, in which the means for performing the channel function comprises means for back propagating through the wireless communication channel to train a neural network based communication system end-to-end.

17. The method of claim 16, in which the neural network based communication system is a hybrid system comprising:
a neural network receiver or a neural network transmitter; or
a full neural network based system comprising the neural network receiver and the neural network transmitter.

18. The method of claim 13, further comprising means for determining the conditional probability distribution via the means for conditional variational encoding.

19. The method of claim 13, further comprising:
means for obtaining an instance of a latent variable by sampling a Gaussian distribution of the latent representation; and
means for determining the conditional probability distribution based on the instance of the latent variable.

20. The method of claim 19, further comprising means for generating a new wireless communication channel based on the instance of the latent variable.

21. The method of claim 13, further comprising means for collecting the transmit and receive sequences based on first data transmitted on the wireless communication channel by a transmitter and second data received on the channel at a receiver.

22. The method of claim 21, in which, for each transmit and receive sequence, the first data corresponds to the second data.

23. An apparatus for an artificial neural network, comprising:
a processor;
a memory coupled with the processor; and
instructions stored in the memory and operable, when executed by the processor, to cause the apparatus:
to determine a conditional probability distribution representing a wireless communication channel based on a data set of transmit and receive sequences associated with one or more wireless communication node;
to determine a latent representation of the wireless communication channel based on the conditional probability distribution; and
to perform a channel-based function based on the latent representation.

24. The apparatus of claim 23, in which the artificial neural network further comprises a conditional variational auto-encoder (VAE), and the conditional VAE comprises an encoder and a decoder.

25. The apparatus of claim 24, in which the instructions further cause the apparatus to perform the channel-based function via the conditional VAE, the channel-based function comprising estimating one or more properties associated with the wireless communication channel, decoding channel codes, compressing a channel state, and detecting symbols.

26. The apparatus of claim 24, in which performing the channel function comprises randomly selecting an instance of a latent variable from the latent representation to generate a simulated wireless communication channel by the decoder of the conditional VAE.

27. The apparatus of claim 24, in which performing the channel function comprises back propagating through the wireless communication channel to train a neural network based communication system end-to-end.

28. The apparatus of claim 27, in which the neural network based communication system is a hybrid system comprising:
   a neural network receiver or a neural network transmitter; or
   a full neural network based system comprising the neural network receiver and the neural network transmitter.

29. The apparatus of claim 24, in which the instructions further cause the artificial neural network to determine the conditional probability distribution via the conditional VAE.

30. The apparatus of claim 24, in which the instructions further cause the apparatus:
   to obtain an instance of a latent variable by sampling a Gaussian distribution of the latent representation; and
   to determine the conditional probability distribution based on the instance of the latent variable.

31. The apparatus of claim 30, in which the instructions further cause the apparatus to generate a new channel based on the instance of the latent variable.

32. The apparatus of claim 23, in which the instructions further cause the apparatus to collect the transmit and receive sequences based on first data transmitted on the wireless communication channel by a transmitter and second data received on the wireless communication channel at a receiver.

33. The apparatus of claim 32, in which, for each transmit and receive sequence, the first data corresponds to the second data.

34. A non-transitory computer-readable medium having program code recorded thereon for an artificial neural network, the program code executed by a processor and comprising:
   program code to determine a conditional probability distribution representing a wireless communication channel based on a data set of transmit and receive sequences associated with one or more wireless communication node;
   program code to determine a latent representation of the wireless communication channel based on the conditional probability distribution; and
   program code to perform a channel-based function based on the latent representation.

35. The non-transitory computer-readable medium of claim 34, in which the artificial neural network further comprises a conditional variational auto-encoder (VAE), and the conditional VAE comprises an encoder and a decoder.

36. The non-transitory computer-readable medium of claim 35, in which the program code further comprises program code to perform the channel-based function via the conditional VAE, the channel-based function comprising estimating one or more properties associated with the wireless communication channel, decoding channel codes, compressing a channel state, and detecting symbols.

37. The artificial neural network of claim 35, in which performing the channel function comprises randomly selecting an instance of a latent variable from the latent representation to generate a simulated wireless communication channel by the decoder of the conditional VAE.

38. The artificial neural network of claim 35, in which performing the channel function comprises back propagating through the wireless communication channel to train a neural network based communication system end-to-end.

39. The artificial neural network of claim 38, in which the neural network based communication system is a hybrid system comprising:
   a neural network receiver or a neural network transmitter; or
   a full neural network based system comprising the neural network receiver and the neural network transmitter.

40. The artificial neural network of claim 35, in which the program code further comprises program code to determine the conditional probability distribution via the conditional VAE.

* * * * *